(12) United States Patent
Usami et al.

(10) Patent No.: US 7,461,390 B2
(45) Date of Patent: Dec. 2, 2008

(54) OPTICAL PICK UP APPARATUS

(75) Inventors: Yoshiya Usami, Tokorozawa (JP);
Kazutaka Goami, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 275 days.

(21) Appl. No.: 10/592,691

(22) PCT Filed: Mar. 15, 2005

(86) PCT No.: PCT/JP2005/004527

§ 371 (c)(1),
(2), (4) Date: Sep. 13, 2006

(87) PCT Pub. No.: WO2005/088619

PCT Pub. Date: Sep. 22, 2005

(65) Prior Publication Data

US 2007/0274164 A1    Nov. 29, 2007

(30) Foreign Application Priority Data

Mar. 16, 2004   (JP) .............................. 2004-074606

(51) Int. Cl.
*G11B 7/09* (2006.01)
(52) U.S. Cl. ...................................... 720/681; 720/684
(58) Field of Classification Search ................ 369/30.1; 720/681, 684
See application file for complete search history.

(56) References Cited

U.S. PATENT DOCUMENTS 6,625,091 B2 * 9/2003 Obara ..................... 369/44.14
7,002,878 B2 * 2/2006 Inui et al. ................. 369/44.14

FOREIGN PATENT DOCUMENTS

| JP | 62-57132 | 3/1987 |
|----|----------|--------|
| JP | 5-197983 | 8/1993 |
| JP | 7-296400 | 11/1995 |
| JP | 9-147389 | 6/1997 |
| JP | 9-320079 | 12/1997 |
| JP | 10-21556 | 1/1998 |
| JP | 2000-149294 | 5/2000 |
| JP | 2000-182260 | 6/2000 |
| JP | 2000-260041 | 9/2000 |
| JP | 2001-229556 | 8/2001 |
| JP | 2002-197690 | 7/2002 |
| JP | 2002-334459 | 11/2002 |
| JP | 2003-85794 | 3/2003 |
| JP | 2003-85796 | 3/2003 |

* cited by examiner

*Primary Examiner*—Aristotelis M Psitos
(74) *Attorney, Agent, or Firm*—Kratz, Quintos & Hanson, LLP

(57) ABSTRACT

A stopper 30 includes a projected portion 35 for restricting movement of a movable section in a focusing direction and a wall section 34 for restricting movement of the movable section in a tracking direction, the projected portion 35 and the wall section 34 being integrally formed from a synthetic resin. With the arrangement, a single stopper 30 can simultaneously restrict the movements of the movable section both in the focusing direction and the tracking direction and determine its movable ranges. Accordingly, unlike conventional arrangements, discrete stoppers for the focusing direction and the tracking direction do not have to be provided, thereby reducing the number of components and cost as well as facilitating mounting operation. In addition, even when a strong impact is applied, the stopper will not be deformed.

10 Claims, 7 Drawing Sheets

OPTICAL PICK UP APPARATUS

TECHNICAL FIELD

The present invention relates to an optical pickup apparatus for reading or writing information from or on an optical recording medium.

BACKGROUND ART

There has been conventionally known an optical pickup apparatus for recording information in or reproducing recorded information from an optical recording medium such as a CD (Compact Disc) and a DVD (Digital Versatile Disc) (see, for instance, Patent Document 1).

The optical pickup apparatus of the Patent Document 1 includes: an actuator in which a movable section including a lens holder holding an objective lens is movably connected to an actuator base via four linear resilient members; and a suspension base on which a pair of yokes and upright portions are provided, the yokes including a pair of magnets that are disposed oppositely on both lateral sides of the movable section with a predetermined space therebetween, the upright portions disposed oppositely so as to surround sides of the movable section in a tracking direction.

A pair of fixing arms are provided on both lateral sides of the lens holder of the movable section, the fixing arms spaced apart from each other by a predetermined distance in a focusing direction. The upright portions each include an insertion hole through which a stopper is attached. The stopper is a metallic linear member that is bended substantially in a C shape. Formed on tip ends of the C shape of the stopper are restraining sections that are disposed substantially at the center of the fixing arms that are provided on both lateral sides of the lens holder of the movable section, the fixing arms spaced apart from each other by the predetermined distance in the focusing direction.

With the arrangement, when the movable section is moved in the focusing direction, the fixing arms formed on both lateral sides of the lens holder abut on the restraining sections, which restricts a movable range of the movable section. When the movable section is moved in the tracking direction, the fixing arms abut on the upright portions, which restricts a movement of the movable section in the tracking direction.

[Patent Document 1] JP-A-2001-229556 (page 9 and FIGS. 1 and 2)

DISCLOSURE OF THE INVENTION

Problems to be Solved by the Invention

In Patent Document 1, the movement of the movable section in the focusing direction is restricted by the stopper, while that in the tracking direction is restricted by the upright portions. In order to maintain accuracy of the movable ranges of the movable section when the movable section is mounted on the suspension base, high dimensional accuracy is required for each of components that determine the movable ranges of the movable section, i.e., the stopper, the upright portions, the insertion holes formed on the upright portions, the suspension base on which the upright portions are formed and the movable section. Accordingly, a mounting operation of these components becomes complicated.

In addition, since the stoppers are made of metallic, the stoppers might be permanently deformed due to a strong impact, which causes its spring property to be changed. Further, insulating treatment has to be provided in order to avoid an electrical short with electric circuits provided on the suspension base and the movable section, thereby complicating an operation and increasing a production cost.

An object of the present invention is to provide an optical pickup apparatus that allows a movable section to be mounted with ease and has an excellent impact resistance.

Means for Solving the Problems

An optical pickup apparatus according to an aspect of the present invention includes: a supporter; a movable section that includes a lens and is adapted to move in a focusing direction along an optical axis direction of the lens and in a tracking direction intersecting the focusing direction, the movable section connected to the supporter via a resilient member; and a stopper including a focusing direction restricting section that is formed as a projection having facing sides on which mutually-facing surfaces of projected portions of the movable section are adapted to abut, the projected portions spaced apart from each other in the focusing direction, and a tracking direction restricting section that is formed as a wall section disposed at a position away in the tracking direction from the projected portions by a predetermined distance such that tip ends of the projected portions are adapted to abut on the wall section, the focusing direction restricting section and the tracking direction restringing section integrally formed from a synthetic resin.

Figure 1:
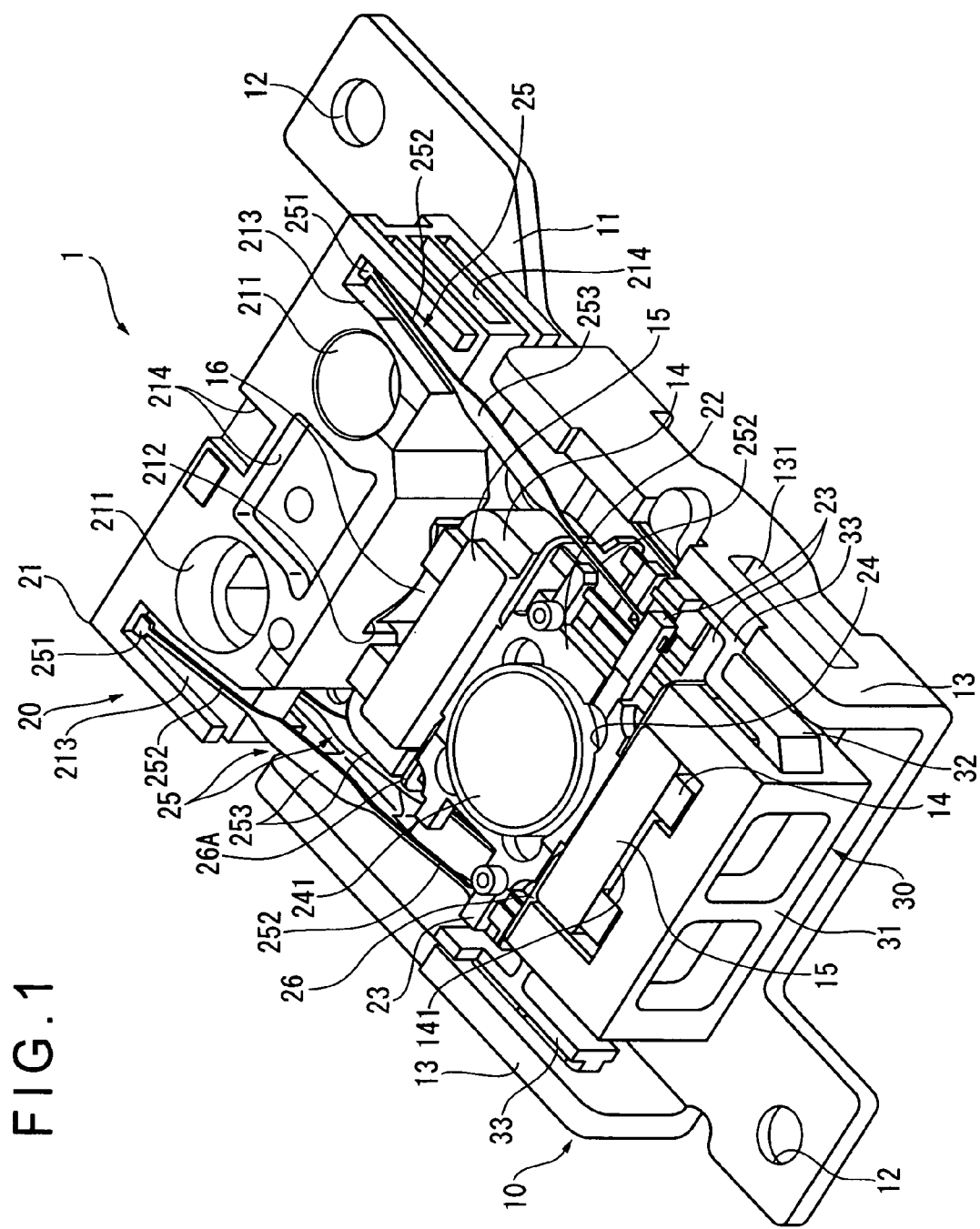
FIG. 1 is an entire perspective view of an optical pickup apparatus according to an embodiment.

EXPLANATION OF CODES 1 optical pickup apparatus
10 actuator base (base)
21 suspension base (supporter)
22 movable section
23 fixing arm (resilient member fixture)
25 suspension (resilient member)
30 stopper
31 stopper base (linking section)
34 wall section (tracking direction restricting section)
35 projected portion (focusing direction restricting section)
36 first engaging claw (positioning claw)
37 second engaging claw (positioning claw)
38 engaging piece (projection)
131 positioning groove
141 dent
241 objective lens (lens)
F focusing direction
T tracking direction

BEST MODE FOR CARRYING OUT THE INVENTION

An embodiment of the present invention will be described below with reference to the attached drawings. FIGS. 1 to 6 each show an optical pickup apparatus 1 of the present embodiment.

[Arrangement of Optical Pickup Device]

As shown in FIG. 1, the optical pickup apparatus 1 includes an actuator base (base) 10, a pickup actuator 20 and a stopper 30. The optical pickup apparatus 1 is incorporated in a recording medium drive for recording information in or reproducing recorded information from a discoidal optical recording medium having an information-recording surface, the recording medium being typically a CD, a DVD or the like. Examples of the recording medium drive may include a CD drive or a DVD drive that is internally or externally connected to terminal equipment such as a personal computer, a CD player or a DVD player that is connected to a television, audio equipment, etc. and a portable CD player of a stand-alone type. The optical pickup apparatus 1 is attached at a position facing the information recording surface of the optical recording medium stored in such recording medium drive in a manner movable in a radial direction of the information recording surface (i.e., tracking direction T).

[Arrangement of Actuator Base]

The actuator base 10 is attached to a pickup supporter (not shown). The pickup supporter is connected to a driving mechanism (not shown) and adapted to move the optical pickup apparatus in the tracking direction T along a surface of the optical recording medium under the control of the driving mechanism. The pickup supporter includes a laser source (not shown). A laser beam irradiated from the laser source travels on an optical path defined by an optical system and reaches a lower side of a later-described objective lens 241. A directing mirror (not shown) is disposed on the lower side of the objective lens 241, and the laser beam is directed upward by the directing mirror so as to pass through the objective lens 241 from the lower side to the upper side thereof. The optical recording medium (not shown) is disposed on the upper side of the objective lens 241. The objective lens 241 collects the laser beam onto the information recording surface of the optical recording medium.

The actuator base 10 is made of a relatively light metal such as an aluminum. The actuator base 10 includes: a base 11 formed substantially in a rectangular flat plate shape; a pair of upright portions 13 that are upright from the base 11 along a direction orthogonal to the tracking direction; a pair of yokes 14 that are upright from the base 11 along a direction substantially parallel to the tracking direction; and a pair of magnets 15 that are fixed to the yokes 14.

The base 11 includes attachment holes 12 through which the base 11 is attached to the pickup supporter by screwing or the like. The pickup actuator 20 is fixed on the base 11. When the pickup actuator 20 is attached, a later-described suspension base (supporter) 21 is fixed on the base 11 of the actuator base 10 so that a later-described movable section 22 is disposed at a position between the pair of upright portions 13 and between the pair of magnets 15 in a manner spaced apart from each of the upright portions 13 and the magnets 15 by a predetermined distance.

The base 11 of the actuator base 10 includes holes formed at positions corresponding to base fixture holes 211 formed on the suspension base 21. By screwing the holes and the base fixture holes 211, the suspension base 21 is fixed on the base 11. The fixture of the suspension base 21 is not limited to the screwing, and the suspension base 21 may be pinned by a pin or adhered by an adhesive. The base 11 includes a projection 16 formed in a shape corresponding to the shape of an M-shaped groove 212 formed on the suspension base 21. The projection 16 engages with the M-shaped groove 212 of the suspension base 21 and serves as a positioning member in fixing the suspension base 21.

The upright portions 13 each include a positioning groove 131 to which the later-described stopper 30 is positioned and fixed. The yokes 14 each include a dent 141 formed on a part of the upper surface thereof. The dents 141 are formed so that an adhesive for fixing the magnets 15 is introduced therefrom. The magnets 15 are fixed on facing surfaces of the pair of yokes 14, the magnets 15 generating a magnetic field.

[Arrangement of Pickup Actuator]

Figure 2:
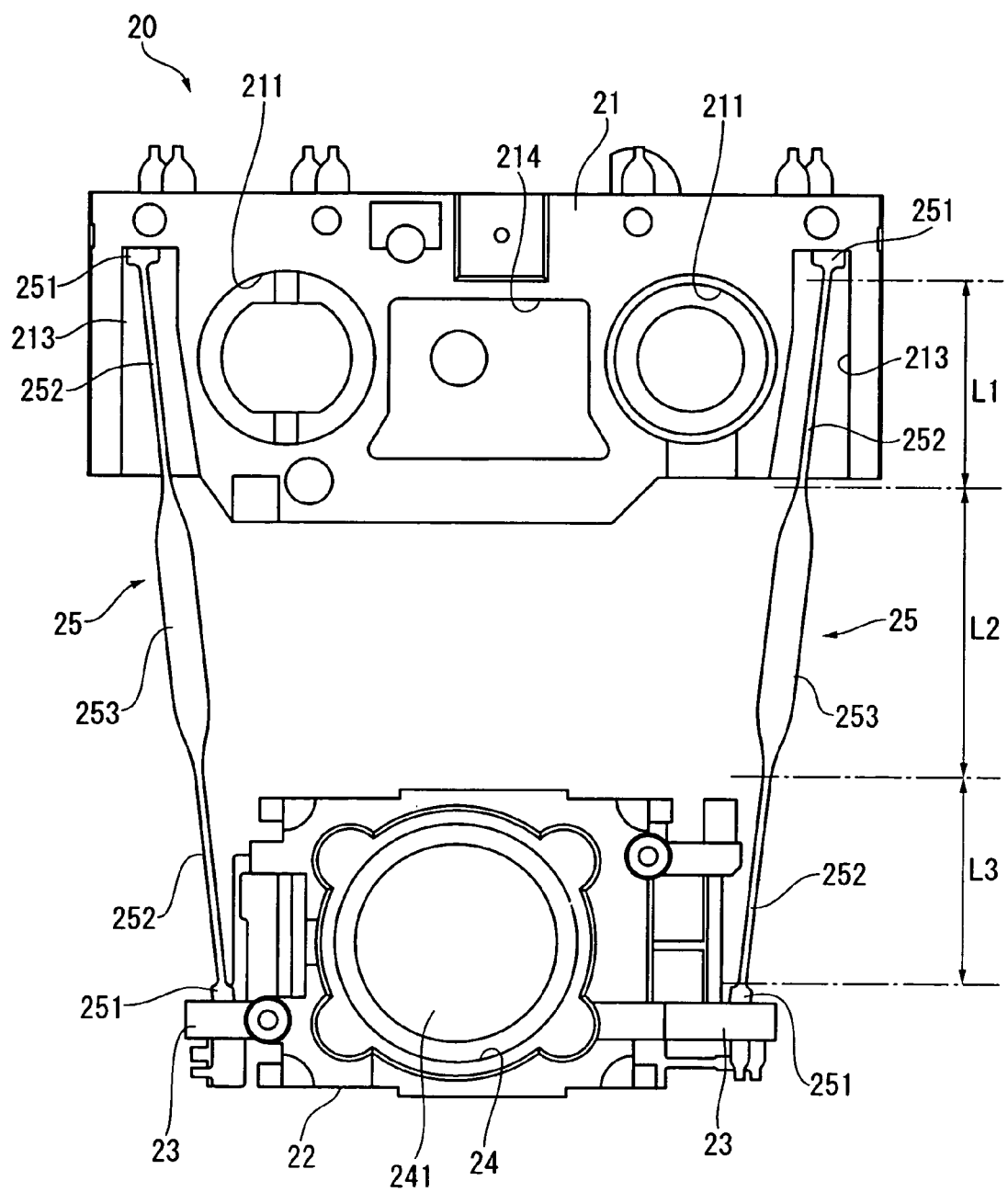
FIG. 2 is a front view of a pickup actuator.

As shown in FIGS. 1 and 2, the pickup actuator 20 includes: the suspension base (supporter) 21 fixed on the base 11 of the actuator base 10; the movable section 22 movably attached to the suspension base 21, and a suspension (resilient member) 25 for linking the suspension base 21 and the movable section 22. The suspension base 21 and the movable section 22 are each made of a synthetic resin.

The suspension 25 as a spring member is made of a material having a strength large enough to withstand a high bending stress as well as a fatigue resistance high enough to withstand a repetitive application of the stress, which is exemplified by a metal such as a beryllium copper. These suspension base 21 and movable section 22 are insert-molded with the suspension 25 inserted therein. Incidentally, a plurality of lightening portions 214 are formed on each of the suspension base 21 and the movable section 22 so that the thickness of the synthetic resin becomes substantially uniform, thereby preventing generation of shrink marks on the surface due to shrinkage during the insertion molding.

The suspension base 21 includes the base fixture holes 211, the M-shaped groove 212 and suspension insertion grooves 213. The base fixture holes 211 extend through the suspension base 21 in focusing direction. As described above, the base fixture hole 211 serves as an insertion hole to which a screw or a pin is inserted when the suspension base 21 is fixed on the base 11 of the actuator base 10 by screwing or by pinning. The M-shaped groove 212 is formed on the suspension base 21 on a side facing the actuator base 10. As described above, the M-shaped groove is engaged with the projected piece 16 formed on the base 11 of the actuator base 10 so as to be used for positioning between the actuator base 10 and the suspension base 21.

The suspension insertion grooves 213 are each formed at four ends of a surface of the suspension base 21, the surface facing to the movable section 22. The suspension insertion grooves 213 are dented in a direction substantially the same as the longitudinal direction of the suspension 25. The suspensions 25 are inserted in the suspension insertion grooves 213. A damping agent is filled up in a space between the suspension 25 and the suspension insertion groove 213 to prevent vibration of the suspension 25 up to a predetermined frequency. The damping agent is a gel-like chemical substance for damping. Filling the space between the suspension 25 and the suspension insertion groove 213 with the damping agent damps vibration of the suspension 25 as well as enhancing fixing force of the suspension 25.

The movable section 22 includes: a lens holder 24 for holding an objective lens 241 (see FIG. 1); four fixing arms (resilient member fixtures) 23 projecting from both lateral sides of the movable section 22 (two projecting from one side and the other two projecting from the other side); and a coil substrate 26. The lens holder 24 has a hollow shape extending through the movable section in the focusing direction substantially at the center of the movable section. The objective lens 241 is fixed on the upper side of the lens holder 24. As described above, the lens holder 24 passes through the laser beam having a predetermined luminous intensity irradiated from the laser source of the pickup supporter (not shown).

The objective lens 241 collects the laser beam onto the information recording surface of the optical recording medium.

The fixing arms 23 are formed on four ends of the movable section 22 on a side opposite to the side facing the suspension base 21, each of the fixing arms 23 projecting in the tracking direction T. A pair of the fixing arms 23 projecting from each lateral side of the movable section 22 are spaced apart from each other in the focusing direction by a predetermined distance. The suspension 25 is fixed on the fixing arm 23, the suspension 25 connecting the movable section 22 in a swingable manner to the suspension base 21.

A pair of coil boards 26 are fixed on the movable section 22 on a surface facing the suspension base 21 and on a surface opposite to the facing side. When the pickup actuator 20 is attached to the actuator base 10, the movable section 22 is surrounded by the pair of upright portions 13 and the pair of yokes 14 as described above. Here, the coil boards 26 are disposed oppositely to the magnets 15 fixed on the yokes 14. With the arrangement, the movable section 22 is disposed in the magnetic field of the magnets 15. Accordingly, when a drive current having a frequency within a predetermined servo band (e.g., 0-5 KHz) is applied to a focusing coil (not shown) and a tracking coil (not shown) that are formed on the coil boards 26, the movable section 22 is moved to the focusing direction F and the tracking direction T due to a force generated by the current in the coils and the magnetic field.

The suspension 25 includes flat plate portions 251 formed on both ends of the suspension 25, shafts 252 linked to the flat plate portions 251 and a wide portion 253 linked to the shafts 252, the flat plate portions 251, the shafts 252 and the wide portion 253 being integrally formed. Herein, the shafts 252 on both end sides of the suspension and the wide portion 253 extending between the shafts 252 each have a length of approx. one third of the entire length in the longitudinal direction of the suspension 25. The entire length in the longitudinal direction of the suspension 25 is a length from the shaft 252 on one end side of the suspension 25 to the shaft 252 on the other end side. Specifically, a length L1 of the shaft 252 on one end side, a length L3 of the shaft 252 on the other end side and a length L2 of the wide portion 253 linked to these shafts 252 are set to be substantially uniform.

When the insert-molding is performed, the flat plate portions 251 are each inserted and fixed in the suspension base 21 and the fixing arm 23 of the movable section 22. The flat plate portion 251 is fixed with its tip ends projecting from the suspension base 21 and the fixing arm 23. Then, a projecting portion of the tip end of the flat plate portion 251 fixed in the suspension base 21 is electrically connected to a wiring (not shown) and further connected to an electrical circuit (not shown). A projecting portion of the tip end of the flat plate portion 251 fixed in the fixing arm 23 is connected to the coil board 26 fixed on the movable section 22 so that a current is applied from the electric circuit to the coil board 26 via the suspension 25.

The shaft 252 extends substantially axially and linearly. As described above, the space between the shaft 252 on the suspension base 21 side and the suspension insertion groove 213 is filled with the damping agent, which strengthens the fixing force between the suspension base 21 and the suspension 25, while damping the vibration up to a predetermined frequency. Herein, the frequency that can be damped is a frequency up to, for instance, 60 Hz, which is adjustable by types and the like of the damping agent.

The wide portion 253 is linked to the shaft 252 and adapted to have a large width in the tracking direction T. The wide portion 253 is tapered so as to gradually widen from a linking portion between the wide portion 253 and the shaft 252 toward a portion away therefrom. Accordingly, an excessive force does not act on the linking portion between the shaft 252 and the wide portion 253, thereby preventing damage on the suspension 25. By forming the wide portion 253 having the above-described width, strength against torsion can be enhanced, so that vibration with high frequency that cannot be damped by the damping agent, e.g., a frequency of torsion resonance of the suspension 25 can be set to higher than a disc rotation frequency range.

Figure 3:
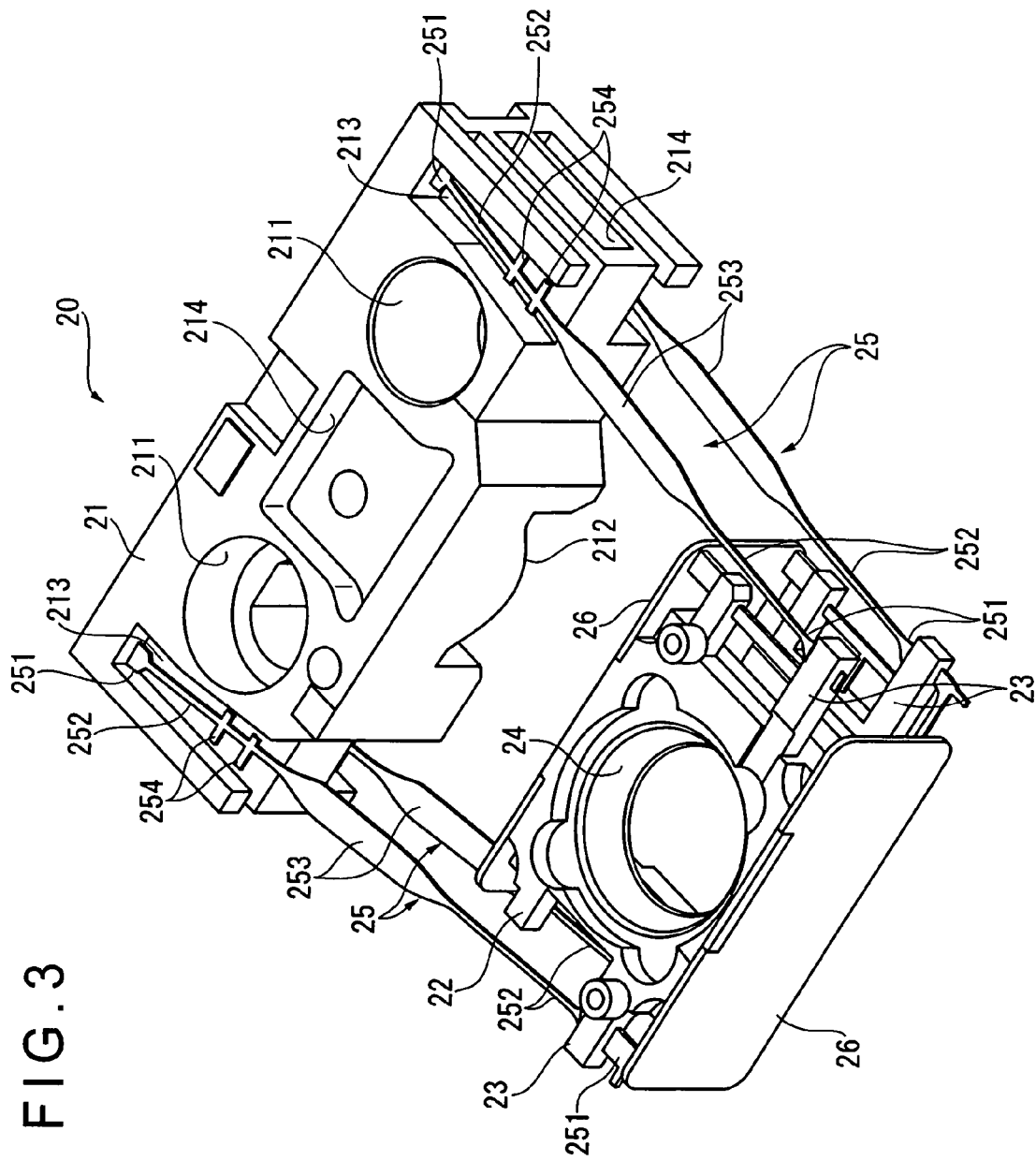
FIG. 3 is a perspective view of the pickup actuator showing a modification of a suspension of the embodiment.

Incidentally, as shown in FIG. 3, the shaft 252 of the suspension 25 may be provided with projected surfaces 254 extending in the tracking direction T. By providing such projected surfaces 254, a contact area between the damping agent filled up the suspension insertion groove 213 and the suspension 25 is increased, so that enhanced damping effect provided by the damping agent on the suspension will be expected.

[Arrangement of Stopper]

Figure 4:
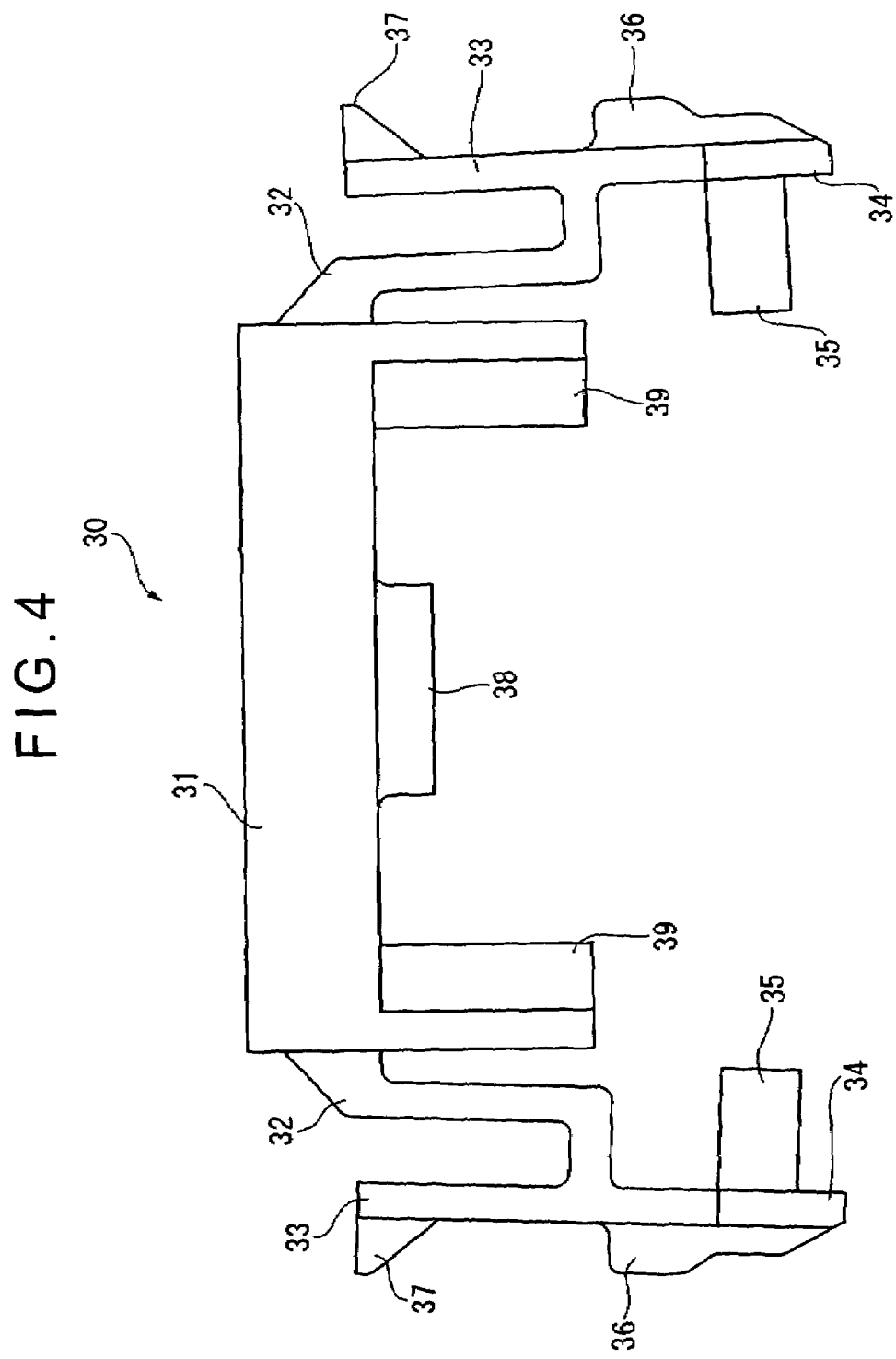
FIG. 4 is a front view of a stopper.
Figure 5:
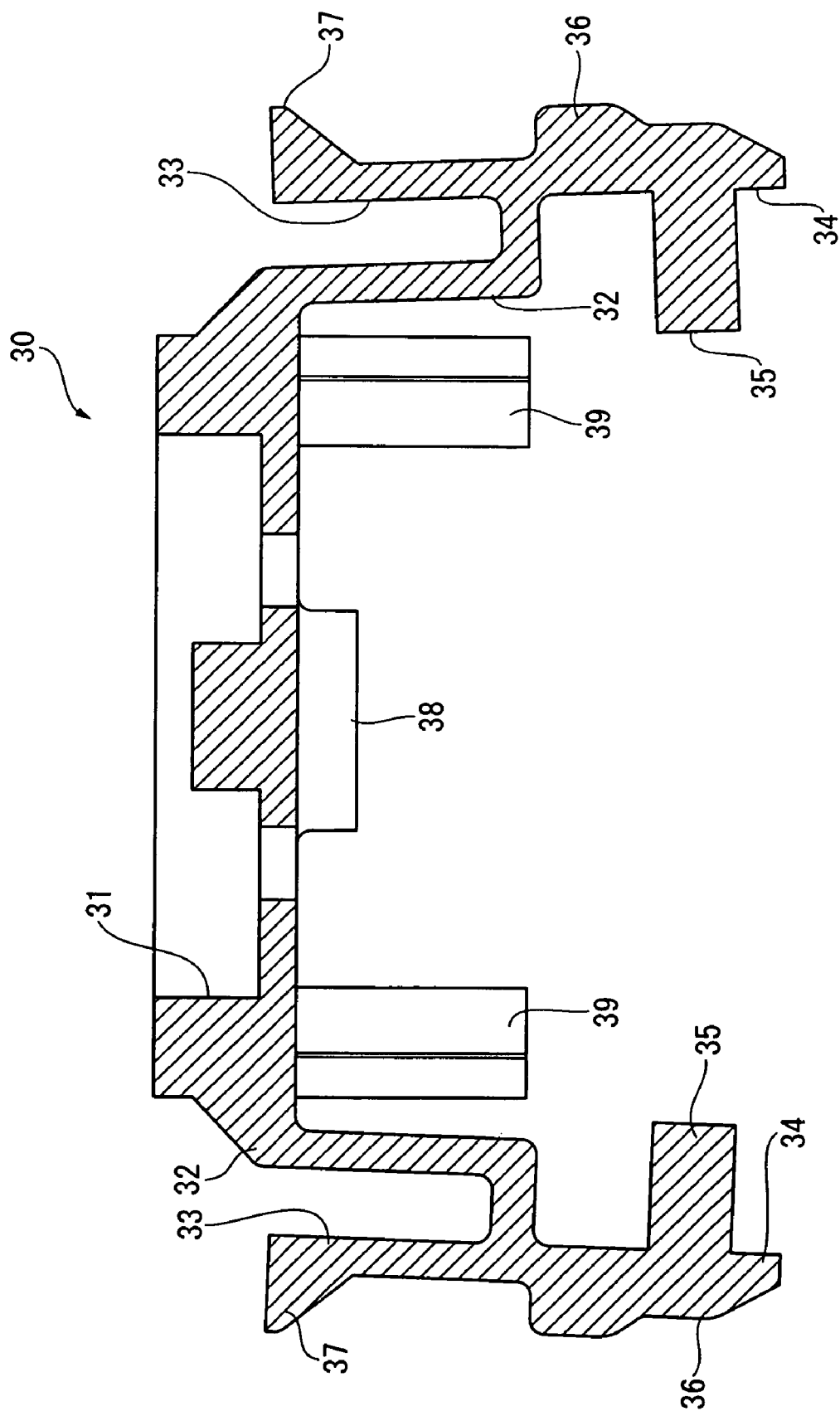
FIG. 5 is a cross section of the stopper.
Figure 6:
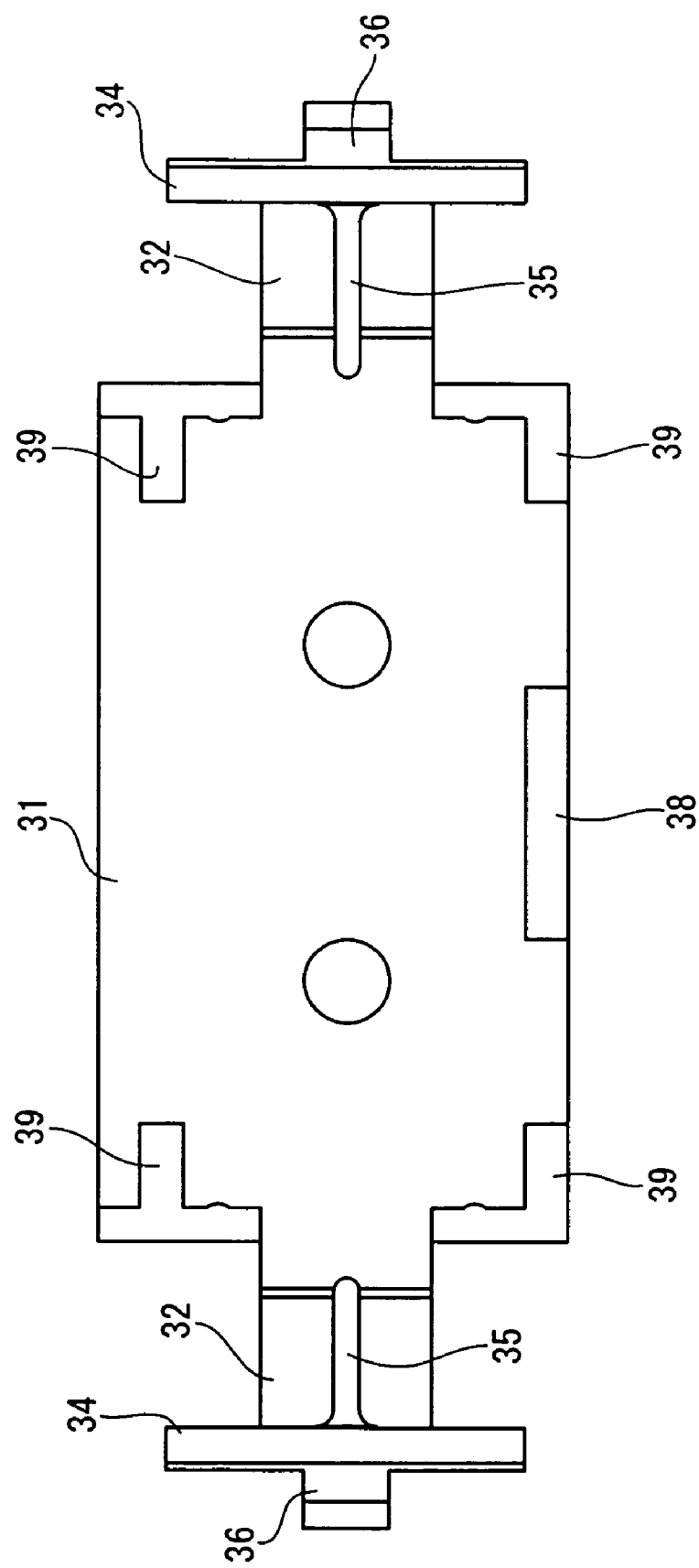
FIG. 6 is a side view of the stopper.

In FIGS. 4 to 6, the stopper 30 is made of, for instance, a synthetic resin and formed substantially in a C-shape. The stopper 30 includes a stopper base (linking section) 31, connecting sections 32 connected to the stopper base 31 and arms 33 fixed on tip ends of the connecting sections 32, the stopper base 31, the connecting sections 32 and the arms 33 being integrally formed.

The stopper base 31 includes an engaging piece (projection) 38 and holding pieces 39, the engaging piece 38 projecting toward the yoke 14 and the holding pieces 39 projecting from four ends of the stopper base 31 toward the yoke 14 when the stopper 30 is attached to the actuator base 10. The engaging piece 38 engages with the dent 141 formed on the yoke 14 located more distantly from the suspension base 21 out of the pair of yokes 14 of the actuator base 10. The holding pieces 39 sandwich in the tracking direction the yoke 14 with which the engaging piece 38 engages and the magnet 15 fixed on this yoke 14. The stopper base 31 is positioned relative to the tracking direction of the actuator base 10 by the engaging piece 38 and the holding pieces 39.

The connecting sections 32 extend from both lateral sides of the stopper base 31 toward the tracking direction T. The arms 33 formed on the tip ends of the connecting sections 32 are arranged substantially in parallel to both lateral sides of the stopper base 31. The arms 33 are each formed so that the longitudinal direction thereof is substantially orthogonal to the tracking direction T and the focusing direction F. Herein, a portion remote from the stopper base 31 in the arm 33 is defined as a tip end of the arm 33, while a portion close to the stopper base 31 in the arm 33 is defined as a base end of the arm 33. When a direction in which the stopper 30 is attached to the actuator base 10 is defined as an attachment direction, the arms 33 are constantly biased by the connecting section 32 so that the tip ends of the arms 33 are spaced apart from each other.

Formed integrally on tip end sides of surfaces facing each other in the pair of arms 33 are: wall sections 34 that restrict a movable range of the movable section 22 in the tracking direction T; and projected portions 35 that project from the wall sections 34 and restrict a movable range of the movable section 22 in the focusing direction F.

The wall sections 34 are each disposed so as to be spaced apart from each tip end of the fixing arms 23 of the movable section 22 by a predetermined distance when the stopper 30 is attached to the actuator base 10 (see FIG. 1), where a distance between the pair of wall sections 34 define the movable range of the movable section 22 in the tracking direction T. When a displacement amount exceeding the movable range is applied to the movable section 22, the tip ends of the fixing arms 23 abut on the wall sections 34, thereby restricting the swing of the movable section 22. The projected portions 35 are each positioned at each of middle positions of the pair of fixing arms 23 that are spaced apart from each other in the focusing direction. A distance in which the fixing arms 23 may move until abutting on the projected portion 35 defines the movable range of the movable section 22 in the focusing direction. When a displacement amount exceeding the movable range is applied to the movable section 22, the fixing arms abut on the projected portions 35, thereby restricting the swing of the movable section 22. Since the movable section 22 can move both in the focusing direction F and the tracking direction T, the size of the wall section 34 in the focusing direction is set to equal to or larger than the movable range of the movable section 22 in the focusing direction.

Formed on each of surfaces opposite to surfaces provided with projected portions 35 in the pair of arms 33, namely surfaces that are more distant from each other in the arms 33, are a first engaging claw (positioning claw) 36 and a second engaging claw (positioning claw) 37. The first engaging claw 36 is formed on the tip end side of the arm 33, while the second engaging claw 37 is formed on the base end side of the arm 33. The engaging claws 36, 37 are each tapered so that the projecting dimension thereof becomes smaller along the attachment direction of the stopper 30. As described above, the engaging claws 36, 37 engage with the positioning groove 131 formed on the upright portion 13 of the actuator base 10, whereby the stopper 30 is fixed to the actuator base 10.

Herein, the positioning groove 131 extends in a direction substantially orthogonal to the focusing direction F and the tracking direction T. When the stopper 30 is to be fixed, the first engaging claw 36 of the stopper 30 is first engaged with the positioning groove 131, and then the stopper 30 is slid along the positioning groove 131 in order to allow the second engaging claw to be engaged with the positioning groove 131. At this time, as long as the length in the longitudinal direction of the positioning groove 131 and a distance from the tip end side of the first engaging claw 36 to the base end side of the second engaging claw 37 are the same, the engaging claws 36, 37 of the stopper 30 are securely fit in the positioning groove 131 of the actuator base 10 to fix the base stopper 30. In addition, the tip end side of the arm 33 is biased toward the positioning groove 131 side by the connecting section 32, thereby enhancing a fixing force for the stopper 30.

[Advantage and Effect of Optical Pickup Device]

In the optical pickup apparatus 1 of the present embodiment, the stopper 30 includes the projected portion 35 for restricting the movement of the movable section 22 in the focusing direction F and the wall section 34 for restricting the movement of the movable section 22 in the tracking direction T, the projected portion 35 and the wall section 34 being integrally formed from the synthetic resin. With the arrangement, a single stopper 30 can simultaneously restrict the movements of the movable section 22 both in the focusing direction F and the tracking direction T and determine its movable ranges. Accordingly, unlike conventional arrangements, discrete stoppers for the focusing direction F and the tracking direction T do not have to be provided, thereby reducing the number of components and cost as well as facilitating mounting operation.

In addition, since the stopper 30 of the present embodiment is made of the synthetic resin instead of a conventional metallic wire, insulation treatment does not have to be provided. Accordingly, cost and steps required in producing the stopper 30 can be reduced. Further, since the stopper 30 is made of the synthetic resin, even when a strong impact is applied thereto, the stopper 30 is not plastically deformed unlike the stopper made of the metallic wire, thereby enhancing the strength of the stopper 30.

The wall section 34 of the stopper 30 is positioned away from the tip ends of the fixing arms 23 by a predetermined distance in the tracking direction T, while the projected portion 35 is positioned at the middle position of the fixing arms 23 that are spaced apart from each other in the focusing direction F. Accordingly, the movable range of the movable section 22 in the tracking direction T is determined by a distance between the movable section 22 and the wall section 34 of the arm 33 of the stopper 30 facing the movable section 22, while the movable range of the movable section 22 in the focusing direction F is determined by a distance between the projected portion 35 and the fixing arms 23. Accordingly, the movable ranges of the movable section 22 can easily adjusted by the stopper 30. Therefore, a complicated mechanism is not required for setting the movable ranges of the movable section 22, so that productivity of the optical pickup apparatus 1 can be enhanced.

The projected portion 35 projects from the wall section 34 in the tracking direction T. With the arrangement, the projected portion 35 and the wall section 34 can determine the movable ranges of the movable section 22 in the focusing direction F and the tracking direction T only by positional relationships between the projected portion 35 and the fixing arms 23 and between the wall section 34 and the fixing arms 23. Accordingly, the arrangement of the stopper 30 can be simplified.

The pairs of projected portions 35 and wall sections 34 are provided so as to sandwich the movable section 22 from both lateral sides thereof. With the arrangement, the pairs of projected portions 35 and wall sections 34 can restrict the movable ranges of the movable section 22 from both sides of the movable section 22. Accordingly, the movable ranges of the movable section 22 can be restricted more reliably.

The pairs of projected portions 35 and wall sections 34 are linked via the stopper base 31 and integrally formed. With the arrangement, a single stopper 30 can restrict the movable ranges of the movable section 22 both in the focusing direction F and the tracking direction T from both lateral sides of the movable section 22. Accordingly, discrete stoppers 30 do not have to be provided on both lateral sides of the movable section 22, thereby enhancing the productivity and reducing the number of components.

The positioning groove 131 is formed on the upright portion 13 of the actuator base 10, and the engaging claws 36, 37 engaging with the positioning groove 131 are formed on the stopper 30. With the arrangement, the stopper 30 can be attached to the actuator base 10 with ease. Accordingly, the productivity of the optical pickup apparatus 1 can be enhanced. Also, since the stopper 30 can be removed easily, maintainability can be enhanced.

The first engaging claw 36 is biased toward the positioning groove 131. With the arrangement, the first engaging claw 36 is securely engaged with and fixed in the positioning groove 131. Accordingly, the stopper 30 can be fixed to the actuator base 10 more securely.

The positioning groove 131 formed on the upright portion 13 of the actuator base 10 is so formed that the longitudinal direction thereof is substantially orthogonal to the focusing direction F and the tracking direction T, and the engaging claws 36, 37 are slid along and engaged with the longitudinal direction of the positioning groove 131 to fix the stopper 30. Accordingly, the stopper 30 can be fixed to the actuator base 10 smoothly. Therefore, the productivity of the optical pickup apparatus 1 can be enhanced.

The first engaging claw 36 and the second engaging claw 37 are formed on the arm 33, the engaging claws 36, 37 engaging with the positioning groove 131. If only one engaging claw is engaged with the positioning groove 131, the stopper might rotate around the engaging claw. In contrast, in the present embodiment, two parts of the positioning groove 131 can be supported by the first engaging claw 36 and the second engaging claw 37. Accordingly, the stopper can be attached to the actuator base 10 without rotating.

Herein, the distance from the tip end side of the first engaging claw 36 to the base end side of the second engaging claw 37 are substantially the same as the length in the longitudinal direction of the positioning groove 131. Accordingly, when the stopper 30 is attached to the actuator base 10, the engaging claws 36, 37 are positioned at both ends of the positioning groove 131, thereby preventing the stopper 30 from shifting in a direction along the longitudinal direction of the positioning groove. Therefore, the stopper 30 can securely be fixed to the actuator base.

The stopper base 31 of the stopper 30 includes the engaging piece 38 projecting toward the dent 141 formed on the yoke 14 of the actuator base 10. Through the engagement between the engaging piece 38 and the dent 141, the stopper 30 can be positioned on the actuator base 10. Therefore, the attachment of the stopper 30 can be performed with ease.

The first engaging claw 36 and the second engaging claw 37 are each tapered so that the projecting dimension thereof becomes smaller along the attachment direction of the stopper 30. With the arrangement, when the stopper 30 is engaged with the positioning groove 131 of the actuator base 10, the engaging claws 36, 37 can be set in the positioning groove with the tapered slant surfaces slid along the positioning groove, thereby facilitating attachment of the engaging claws 36, 37.

The holding pieces 39 are formed on the four ends of the stopper base 31, the holding pieces 39 extending in the same direction as the projecting direction of the engaging piece 38. Accordingly, when the stopper 30 is attached to the actuator base 10, the holding pieces 39 sandwich the yoke 14 and the magnet 15 from both lateral sides in the tracking direction, whereby positioning can be performed.

MODIFICATION OF EMBODIMENT

The present invention is not limited to the embodiment described above but includes modifications and improvements as long as the object of the present invention can be achieved.

Although the stopper 30 includes the engaging piece 38 projecting from the stopper base 31 and the holding pieces 39 formed on the four ends of the stopper base 31 in the embodiment above, the arrangement is not limited thereto. For example, the stopper base 31 may not include the engaging piece 38 and the holding pieces 39. In such case, the shape of the stopper 30 can be simplified, so that the production cost of the stopper 30 can be reduced.

Although the positioning groove 131 is so formed that the longitudinal direction thereof is substantially orthogonal to the focusing direction F and the tracking direction T in the embodiment above, the arrangement is not limited thereto. For example, there may be employed an arrangement in which a positioning hole is formed on the upright portion of the actuator base at a position corresponding to the engaging claw of the stopper, and the engaging claw engages with the positioning hole. With the positioning groove having the longitudinal direction, the engaging claws have to be provided on both ends of the positioning groove in order to prevent the stopper from moving in a direction along the positioning groove and causing rattling to occur. In contrast, with the positioning hole formed at the position corresponding to the engaging claw, the stopper can be securely fixed to the actuator base.

Figure 7:
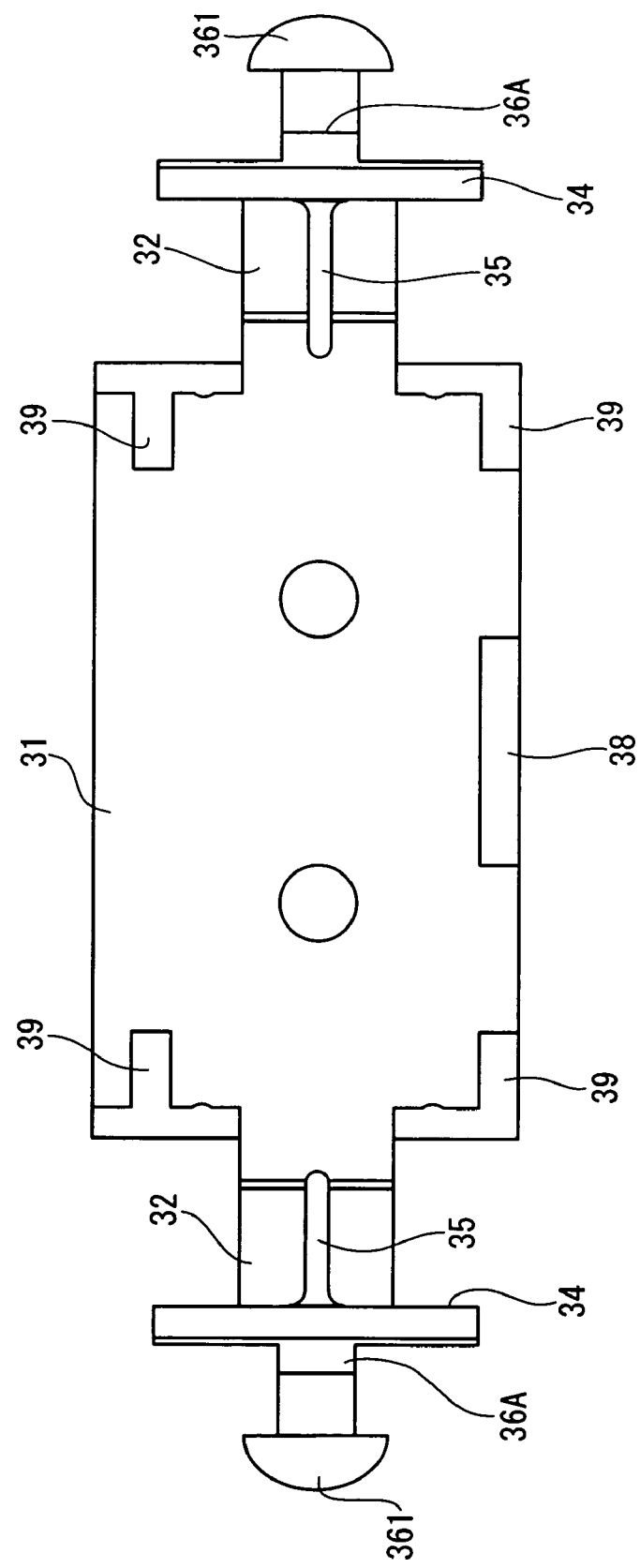
FIG. 7 is a cross section showing a modification of the stopper.

Although the arm 33 of the stopper 30 is biased toward the positioning groove in order to enhance the fixing force between the stopper 30 and the actuator base 10 in the embodiment above, the arrangement is not limited thereto. For example, as shown in FIG. 7, a projection tip end 361 of an engaging claw 36A may be bulged in the focusing direction. Herein, the engaging claw 36A extends through and engages with the positioning groove 131, and the dimension in the focusing direction F of the projection tip end 361 is formed to be larger than that of the positioning groove 131.

With the arrangement, when the engaging claw 36A is engaged with the positioning groove 131, the projection tip end 361 is formed so as to be difficult to disengage from the positioning groove 131, thereby securely fixing the stopper 30 to the actuator base 10. Incidentally, although an example in which the projection tip end 361 of the engaging claw 36A is bulged is exemplified, the arrangement is not limited thereto. For example, there may be employed arrangements in which: a pin or a screw is screwed through the positioning groove into the engaging claw from a side opposite to the side provided with the arm; the stopper is fixed using a screw or a pin without using the engaging claw; and the stopper is adhered and fixed using an adhesive or the like.

The stopper 30 includes the arms 33 disposed on both lateral sides of the movable section 22, the arms 33 each including the wall section 34 and the projected part 35 and the arms 33 linked to each other via the stopper base 31 and the connecting sections 32 in the embodiment above, but the arrangement is not limited thereto. For example, discrete stoppers each having a wall section and a projection are provided on both lateral sides of the movable section 22. With the arrangement, since the discrete stoppers are provided on both lateral sides of the movable section 22, a position of each of the stoppers can be fixed more precisely, thereby controlling the movable ranges of the movable section 22 more precisely. In addition, a stopper having a projection and a wall section may be provided only on one side of the movable section. However, in such case, the movable range of the movable section cannot be restricted on a side without the stopper. Accordingly, the stopper is preferably provided on both lateral sides of the movable section as in the present embodiment.

Although the projected portion 35 projects from the wall section 34 in the present embodiment, the arrangement is not limited thereto. As an example, the projected portion may project from other part of the arm than the wall section. As another example, a pair of projected portions may be formed on upper and lower ends (both ends in the focusing direction) of the wall section, so that the movable ranges of the movable section is restricted between the pair of projected portions.

Although the projected portion is used as the focusing direction restricting section, while the wall section is used as the tracking direction restricting section in the present embodiment, the arrangement is not limited thereto. For example, the focusing direction restricting section may be string members extending from the stopper. In such case, two string members may be stretched in parallel to each other in a direction substantially orthogonal to the focusing direction at positions corresponding to upper and lower ends of the movable range of the movable section in the focusing direction, so that the movable range of the movable section is restricted through abutment of the movable section on the string members. The tracking direction restricting section may be string members extending from the arms of the stopper and connected to the lateral sides of the movable section, the string member provided on both lateral sides of the movable section. With the arrangement, when the movable section moves by a predetermined distance in the tracking direction, a string member provided on an arm that is disposed on a side opposite to the side toward which the movable section moves is strained, thereby restricting the movable range of the movable section.

Although the best arrangement and method for implementing the present invention has been disclosed above, the present invention is not limited thereto. In other words, while the present invention has been described with reference to the specific embodiment and drawings thereof, various modifications in shapes, materials, quantity and other arrangement details may be made to the disclosed embodiment by those of ordinary skill in the art without departing from the technical idea and object of the invention.

Since the description limiting the shapes and the materials described above is intended to be illustrative for easier understanding and not to be limiting the invention, the present invention includes descriptions of members without all or a part of the limitation of the shapes, the material and the like.

ADVANTAGE AND EFFECT OF EMBODIMENT

The stopper 30 includes the projected portion 35 and the wall section 34 that are integrally formed from the synthetic resin, the projected portion 35 restricting the movement of the movable section 22 in the focusing direction F and the wall section 34 restricting the movement of the movable section 22 in the tracking direction T. With the arrangement, a single stopper 30 can simultaneously restrict the movements of the movable section 22 both in the focusing direction F and the tracking direction T.

INDUSTRIAL APPLICABILITY

The present invention is applicable to an optical pickup apparatus for reading or writing information on an optical recording medium.

The invention claimed is:

1. An optical pickup apparatus, comprising:
   a supporter;
   a movable section that includes a lens and is adapted to move in a focusing direction along an optical axis direction of the lens and in a tracking direction intersecting the focusing direction, the movable section connected to the supporter via a resilient member; and
   a stopper including a focusing direction restricting section that is formed as a projection having facing sides on which mutually-facing surfaces of projected portions of the movable section are adapted to abut, the projected portions spaced apart from each other in the focusing direction, and a tracking direction restricting section that is formed as a wall section disposed at positions away in the tracking direction from the projected portions by a predetermined distance such that tip ends of the projected portions are adapted to abut on the wall section, the focusing direction restricting section and the tracking direction restringing section integrally formed from a synthetic resin.

2. The optical pickup apparatus according to claim 1, wherein
   the resilient member includes a plurality of resilient members each formed linearly,
   the projected portions are a plurality of resilient member fixtures each for fixing a tip end of each of the resilient members.

3. The optical pickup apparatus according to claim 2, wherein the projection projects from the wall section.

4. The optical pickup apparatus according to claim 2, wherein the projection and the wall section respectively include a pair of projections and a pair of wall sections so as to be provided on both lateral sides of the movable section.

5. The optical pickup apparatus according to claim 4, wherein
   a linking section is provided for linking the pairs of projections and wall sections, and
   the pairs of projections and wall sections and the linking section are integrally formed.

6. The optical pickup apparatus according to claim 5, wherein the linking section includes a projected piece projecting toward the movable section, the projected piece engaging with a dent that is formed in advance on the base.

7. The optical pickup apparatus according to claim 1, further comprising:
   a base on which the supporter is mounted,
   a positioning groove for positioning the stopper is formed on the base, and
   the stopper includes a positioning claw that engages with the positioning groove.

8. The optical pickup apparatus according to claim 7, wherein the positioning claw is formed on a lateral side of the stopper and biased toward the positioning groove.

9. The optical pickup apparatus according to claim 7, wherein
   the positioning groove has a longitudinal direction that is substantially orthogonal to the focusing direction and the tracking direction, and
   the stopper is slid along the longitudinal direction of the positioning groove to be engaged therewith.

10. The optical pickup apparatus according to claim 9, wherein the positioning claw includes a plurality of positioning claws formed at positions that allow the positioning claws to engage with the longitudinal direction of the positioning groove.

* * * * *